(12) United States Patent
Savry

(10) Patent No.: US 8,141,787 B2
(45) Date of Patent: Mar. 27, 2012

(54) CONTACTLESS COMMUNICATION DEVICE

(75) Inventor: Olivier Savry, Sassenage (FR)

(73) Assignee: Commissariat a l'Energie Atomique, Paris (FR)

( * ) Notice: Subject to any disclaimer, the term of this patent is extended or adjusted under 35 U.S.C. 154(b) by 560 days.

(21) Appl. No.: 12/368,353

(22) Filed: Feb. 10, 2009

(65) Prior Publication Data
US 2009/0224058 A1 Sep. 10, 2009

(30) Foreign Application Priority Data
Mar. 5, 2008 (FR) ...................................... 08 51444

(51) Int. Cl.
*G06K 19/06* (2006.01)
(52) U.S. Cl. ........................................ 235/492; 235/375
(58) Field of Classification Search .................. 235/375, 235/380, 487, 492
See application file for complete search history.

(56) References Cited

U.S. PATENT DOCUMENTS

| 6,724,103 | B2 | 4/2004 | Parrault | |
|---|---|---|---|---|
| 6,774,865 | B1 | 8/2004 | Serra | |
| 2007/0180285 | A1* | 8/2007 | Dembo | 713/500 |
| 2008/0225758 | A1* | 9/2008 | Proctor et al. | 370/279 |
| 2008/0251586 | A1* | 10/2008 | Kawamura et al. | 235/487 |
| 2009/0189828 | A1* | 7/2009 | Shmulevich et al. | 343/876 |

FOREIGN PATENT DOCUMENTS

| FR | 2 812 482 A1 | 2/2002 |
|---|---|---|
| FR | 2 887 712 A1 | 12/2006 |
| WO | 02/01497 A1 | 1/2002 |

\* cited by examiner

*Primary Examiner* — Karl D Frech
(74) *Attorney, Agent, or Firm* — Burr & Brown

(57) ABSTRACT

The invention relates to a device comprising a first inductive antenna and a plurality of chips, each comprising an integrated circuit and a second inductive antenna used to power and communicate with said integrated circuit. According to the invention, one chip amongst the plurality of chips is capable of being connected to first inductive antenna. In addition, the device comprises a third inductive antenna which is inductively coupled to each of the second antennas of the plurality of chips.

11 Claims, 3 Drawing Sheets

CONTACTLESS COMMUNICATION DEVICE

FIELD OF THE INVENTION

The present invention relates to the field of contactless integrated circuits such as contactless smart cards of the type described in Standard ISO 14443 which are capable of receiving and transmitting data by inductive coupling through an antenna.

BACKGROUND OF THE INVENTION

The increasing need to integrate several contactless chips on a single substrate is making itself felt in particular because of growing demand for memory and security.

Integrating several chips on a single substrate does, however, pose the problem of overall dimensions which is linked to communication distances. In fact, contactless cards transmit their data with the aid of a magnetic field, the power of which depends on the size of their on-chip inductive antenna. Consequently, simply placing several contactless chips side-by-side on a single card means that each of them must have a bulky antenna in order to achieve an adequate communication range.

To overcome this problem, Document FR 2 812 482 proposes a contactless multi-chip card which comprises a collective antenna that forms a large surface-area inductive loop in order to obtain a significant communication range. Each of the contactless chips on the card then comprises an antenna which forms an inductive loop having a small surface area and located inside the collective antenna. The collective antenna thus acts as an intermediary for communicating with and powering the contactless chips.

Nevertheless, in this type of architecture, the collective antenna is used as an intermediary both for communication between the chips and the card's external environment (usually a contactless reader) and for inter-chip communication. It therefore follows that complex mechanisms must be provided in order to manage the stream of data that flows through the collective antenna.

In addition, in many applications, some chips are not designed to communicate with a reader located outside the card, only with other chips on the card. This includes arrangements of chips that form a memory assembly for data storage or chips tasked with communications security, such as cryptoprocessors for example.

Communication via just one collective antenna not only causes bandwidth and data collision problems when all communications have to transit via the collective antenna, communications between chips which are not designed to communicate with an external reader can be accessed by the reader and this can be harmful in terms of security in particular.

SUMMARY OF THE INVENTION

The object of the present invention is to resolve the above-mentioned problem by proposing a communication architecture on a card fitted with multiple contactless chips wherein the chips can communicate with each other independently without using the card's antenna provided in order to communicate with the external environment or any other component located off the card, such as a contactless reader for example.

To achieve this, the object of the invention is a device comprising a first inductive antenna and a plurality of chips, each chip comprising an integrated circuit and a second inductive antenna used for powering and communicating with said integrated circuit.

According to the invention, one chip amongst the plurality of chips is capable of being connected to the first inductive antenna and the device also comprises a third inductive antenna which is inductively coupled to each of the second antennas of the plurality of chips.

In other words, a "master" chip ensures communication between the card and its external environment and is used as a gateway to a contactless communication network between the chips, the third antenna of which is used as a bus. This communication network within the card thus allows direct communication between chips without the aid of components off the card and, if necessary, using protocols and/or frequency channels that are different to those used in order to communicate with the contactless reader.

This third antenna will subsequently be referred to as a "bus antenna", the second antenna of a chip will be referred to as a "chip antenna" and the first antenna will be referred to as a "card antenna". Chips other than the master chip will be referred to as "slave" chips.

Note that the connection between the master chip and the card antenna can be implemented in various ways. This connection can be electromagnetic and obtained by inductive coupling between the antenna of the master chip and the card antenna or it can be electrical and be obtained by means of wires or tracks. Electrical connection is preferred in order to allow higher-power transmission and to limit interference between various magnetic fields.

Also, note that, here, inductive coupling between the chip antennas and the bus antenna means that there is an electromagnetic link between the master chip and the slave chips which allows the latter to recover sufficient energy to produce the necessary nominal supply voltage for operation of their internal circuitry.

The energy received by a slave chip depends on the power of the signal transmitted by the master chip and the inductive coupling coefficient, via the bus antenna, between the antenna of the master chip and the antenna of the slave chip. In fact, several parameters contribute towards powering the slave chips correctly.

For example, a master chip which transmits a high-power signal with a low coupling coefficient can be chosen; this makes it possible, for instance, to arrange the chip antennas in a different plane to that of the bus antenna in order to make manufacturing the device simpler.

In contrast, it is also possible to choose a master chip which transmits a lower power signal combined with a high inductive coupling coefficient by placing the surfaces of the chip antennas back to back with that of the bus antenna, for example, in order to limit the overall size of the device. Generally speaking, it is thus possible to envisage any satisfactory combination of master-chip transmit power and coupling coefficient.

Finally, it should be noted that limiting of any interference with an external reader is not achieved solely through electromagnetic confinement of the fields in the device because of the short distance between the chip antennas and the bus antenna. In fact, assuming the chip antennas are powered sufficiently, there are several possible solutions in order to limit interference; electromagnetic confinement and/or inter-chip communication based on a frequency channel that is different to that used by the external reader.

According to one particular embodiment of the invention, each of the second antennas of the plurality of antennas forms at least one inductive loop, the third antenna forms at least one inductive loop and the surface defined by the second antenna is placed back to back with the surface defined by the third antenna.

In other words, strong inductive coupling is obtained between the chip antennas and the bus antenna, thus making it possible to use chip antennas having smaller dimensions, thereby reducing overall size and the transmission range of the chips.

Advantageously, the third antenna is twisted so as to define elementary surface areas that are respectively back to back with the second antennas of the plurality of chips.

In other words, very weak coupling is obtained between each of the chips and an external reader, thus minimizing interference with chip-to-chip communication.

Advantageously, the device is a smart card and the third antenna is twisted in the plane of the card.

In other words, twisting the bus antenna in the plane of the card means that there is no stacking of chips. The thickness of the card therefore remains unchanged.

According to one embodiment of the invention, the third antenna is bent and twisted so as to define elementary surface areas that are respectively wrapped around the second antennas of the plurality of chips. Advantageously, the device is a smart card and the third antenna is bent in a plane which is substantially perpendicular to the plane of the card.

In other words, bending the bus antenna in a plane perpendicular to the card makes it possible to stack the chips. The length and the width of the card thus remain unchanged.

According to one particular embodiment of the invention, the surface area defined by the third antenna substantially equals the total surface area defined by the second antennas of the plurality of chips.

In other words, using strong coupling between the chip antennas and the bus antenna and choosing surface areas which are substantially equal maximizes confinement of the magnetic fields which are used for chip-to-chip communication. The communication network within the chip is therefore effectively isolated from the card's external environment and, in particular, from any external contactless reader.

According to one particular embodiment of the invention, the device is capable of communicating with its external environment via the first antenna over a first communication channel and the chips are capable of communicating with each other via the third antenna over a second communication channel which is different to the first communication channel.

In other words, the internal network uses its own communication channel.

Advantageously, the chip which is capable of being connected to the first antenna comprises a module used to rectify the signal received on the first antenna and a module used to select a frequency range of the rectified signal with the rectified, filtered signal forming a carrier for the second communication channel.

In other words, communication with contactless cards is governed by predefined standards such as Standard ISO 14443 for example, which requires communication between a contactless reader and a contactless card using an amplitude-modulated carrier wave (typically a 13.56 MHz carrier frequency in the context of Standard ISO 14443). The rectifier of the master chip thus produces a signal having a frequency which is twice that of the received signal and the selection module selects a harmonic of the rectified signal, the second harmonic for example. A carrier wave having a frequency which is twice that of the carrier used for communication between the card and the reader is thus obtained for inter-chip communication.

In addition, the electromotive force induced in the bus and chip antennas is proportional to the frequency of the carrier. Using a frequency which is twice as high makes it possible to double the energy transmitted by these antennas and this compensates, at least partially, for their small surface. Similarly, other harmonics may be used for inter-chip communication.

BRIEF DESCRIPTION OF THE DRAWINGS

The invention will be made more readily understandable by the following description which is given merely by way of example and relates to the accompanying drawings in which identical references denote identical or analogous components and in which.

DETAILED DESCRIPTION OF THE INVENTION

Figure 1:
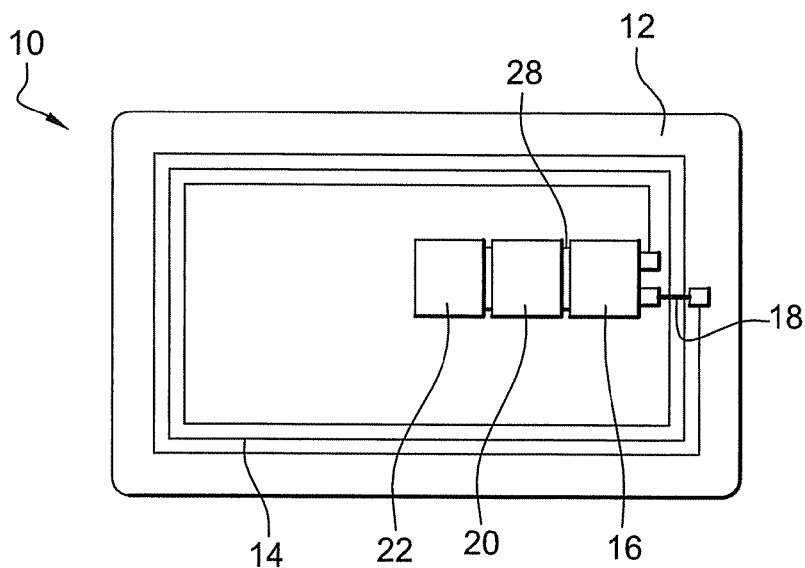
FIG. 1 is a schematic top view of a contactless card according to a first embodiment of the invention.
Figure 2:
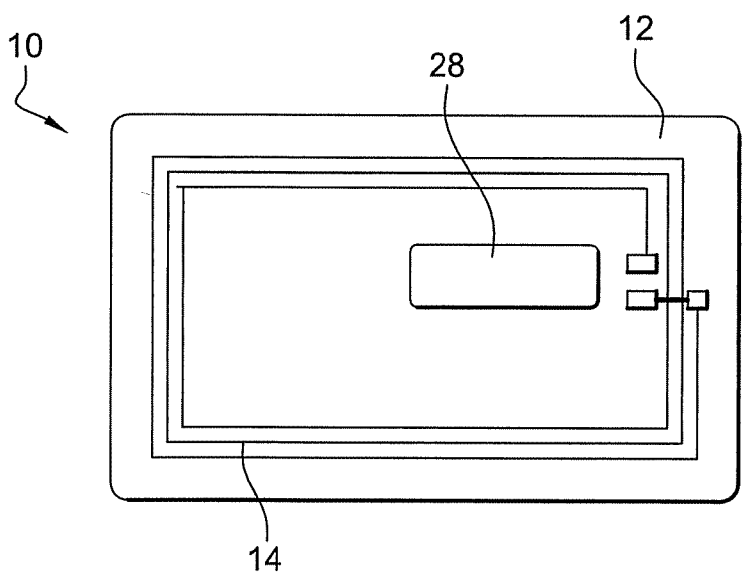
FIG. 2 is a schematic top view of the card in FIG. 1, but without the chips.
Figure 3:
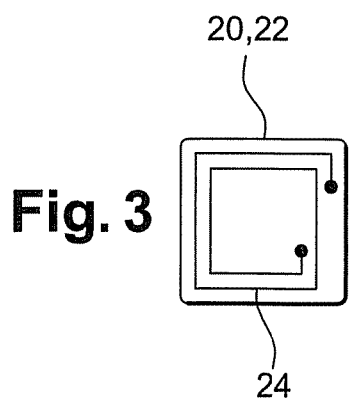
FIGS. 3 and 4 are schematic bottom views of a slave chip and a master chip respectively.

A multi-chip contactless card, which complies with Standard ISO 14443 for example, is shown in FIGS. 1 to 3 and referred to in its entirety as 10. Contactless card 10 comprises a rectangular substrate 12, which is made of plastic for example, on or in which there is a large antenna 14 which forms several inductive loops around the periphery of card 10. Antenna 14 is referred to subsequently as a "card" antenna.

Card 10 also comprises a chip 16 which is referred to as a "master" chip and is electrically connected to card antenna 14, realized for example by means of connections 18 realized using a "flip-chip" technique. Master chip 16 allows card 10 to communicate with its external environment by means of card antenna 14, e.g. contactless communication with a reader (not shown).

Several contactless chips 20, 22 are also provided on card 10, these chips are referred to as "slaves" because they are not electrically connected to card antenna 14.

Each of chips 16, 20, 22 comprises a silicon wafer on one of its faces, referred to as the "active" face, which is used to form an integrated circuit that implements contactless communication functions as well as functions for which the chip is designed, such as data storage, for example.

Figure 4:
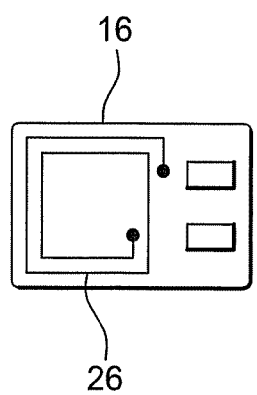

Every chip 16, 20, 22 comprises, on its active face, an individual antenna 24, 26, or "chip" antenna, which forms inductive loops as illustrated in FIGS. 3 and 4 which show the active face.

Finally, card 10 comprises a third antenna 28, referred to as a "bus" antenna which forms an inductive loop on or in the substrate 12 of card 10. This inductive loop defines a surface against which the active surfaces of chips 16, 20, 22 comprising chip antennas 24, 26 are placed back to back.

The small size of chip antennas 24, 26 results in them having weak inductance. The communication range of chip antennas 24, 26 is therefore very short, typically around 1 cm for a 25 mm² chip. However, because chip antennas 24, 26 are placed on bus antenna 28, this creates strong inductive coupling between each chip antenna 24, 26 and bus antenna 28. Chips 16, 20, 22 can therefore communicate with each other via bus antenna 28, thereby creating a communication network which only uses components of card 10 and is independent of the card's external environment.

Preferably, the surface area of bus antenna 28 substantially equals the total surface area of chip antennas 24, 26. This maximizes confinement of the magnetic fields that are used to obtain inter-chip communication.

Figure 5:
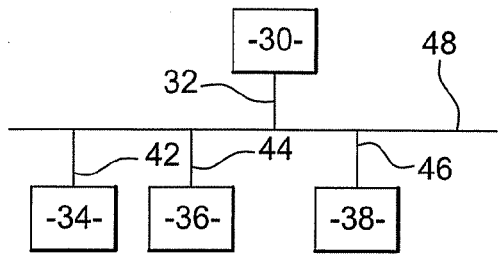
FIGS. 5 and 6 are schematic views of a multi-chip communication network according to the state of the art and the invention.

FIG. 5 schematically shows a state-of-the-art communication network such as that disclosed, for instance, in Document FR 2 812 482, between the integrated circuits of the chips of a contactless card and the circuit of a contactless reader. This network comprises circuit 30 of a contactless reader which is connected to inductive antenna 32, integrated circuits 34, 36, 38 of contactless chips connected respectively to individual inductive antennas 40, 42, 44, antenna 32 of the contactless reader and antennas 42, 44, 46 of the chips which are coupled to collective inductive antenna 48 of the card.

Figure 6:
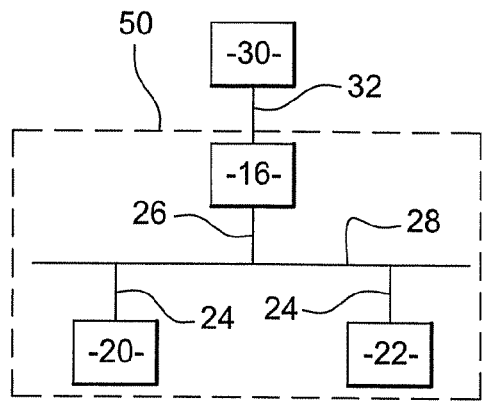

FIG. 6 schematically shows a contactless communication network according to the invention. It is evident that, in contrast to the state of the art, this produces a communication network 50 within card 10, this network being independent of contactless reader 30.

Figure 7:
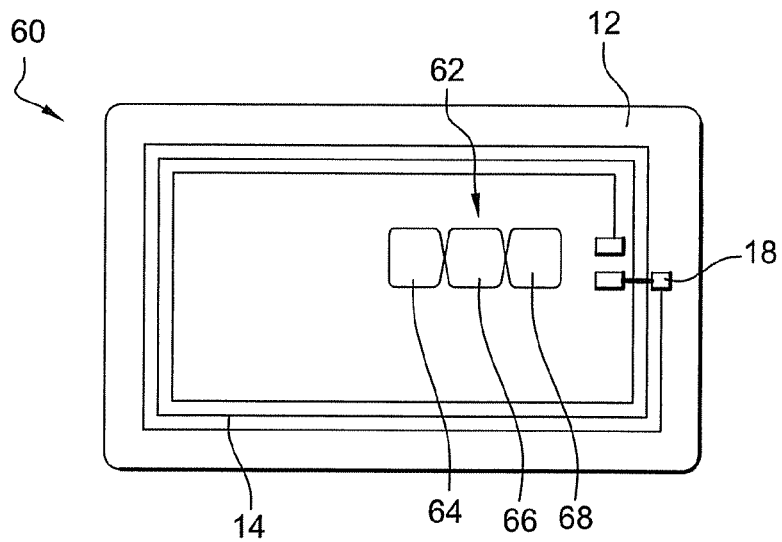
FIG. 7 is a schematic view of a contactless card fitted with a variant of the bus antenna.

FIG. 7 shows a second variant 62 of the bus antenna. With this variant, bus antenna 62 is formed by an inductive loop which is twisted in the plane of contactless card 60 in order to form as many elementary surfaces 64, 66, 68 as there are contactless chips with the active surfaces of the latter being arranged respectively on these elementary surfaces. Even weaker coupling of each of the chip antennas to an antenna of a contactless reader is obtained in this way. In addition, interference is minimized.

In the above description, the bus antenna is formed in the plane of the contactless card, thus defining a sufficient surface area in order to place the master chip and the slave chips back to back. There is therefore no stacking of chips and the thickness of the contactless card remains unchanged.

Nevertheless, there may be a requirement to limit the length and/or the width of the contactless card.

Figure 8:
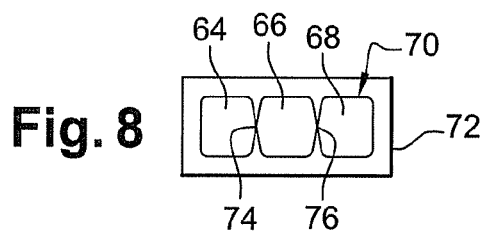
FIG. 8 is a schematic top view of another variant of the bus antenna.
Figure 9:
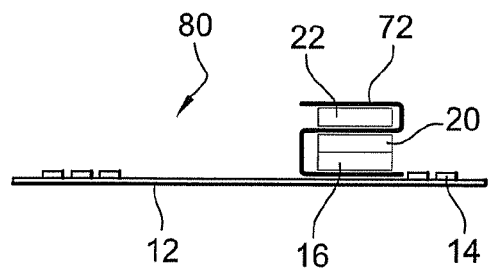
FIG. 9 is a schematic side view of a contactless card according to a second embodiment of the invention.

In FIG. 8, bus antenna 70 is formed on a flexible substrate 72 which is separate from that of the contactless card. The bus antenna is twisted in order to define elementary surfaces similar to those in FIG. 7 and substrate 72, and hence antenna 70, is bent at twist points 74, 76 in order to define a stage which is perpendicular to the plane of contactless card 80, as shown in FIG. 9. The master and slave chips 16, 20, 22 are stacked in the compartments thus defined with their respective active surfaces placed back to back on elementary surfaces 64, 66, 68. A reduction in the surface area of the contactless card is obtained in this way.

Figure 10:
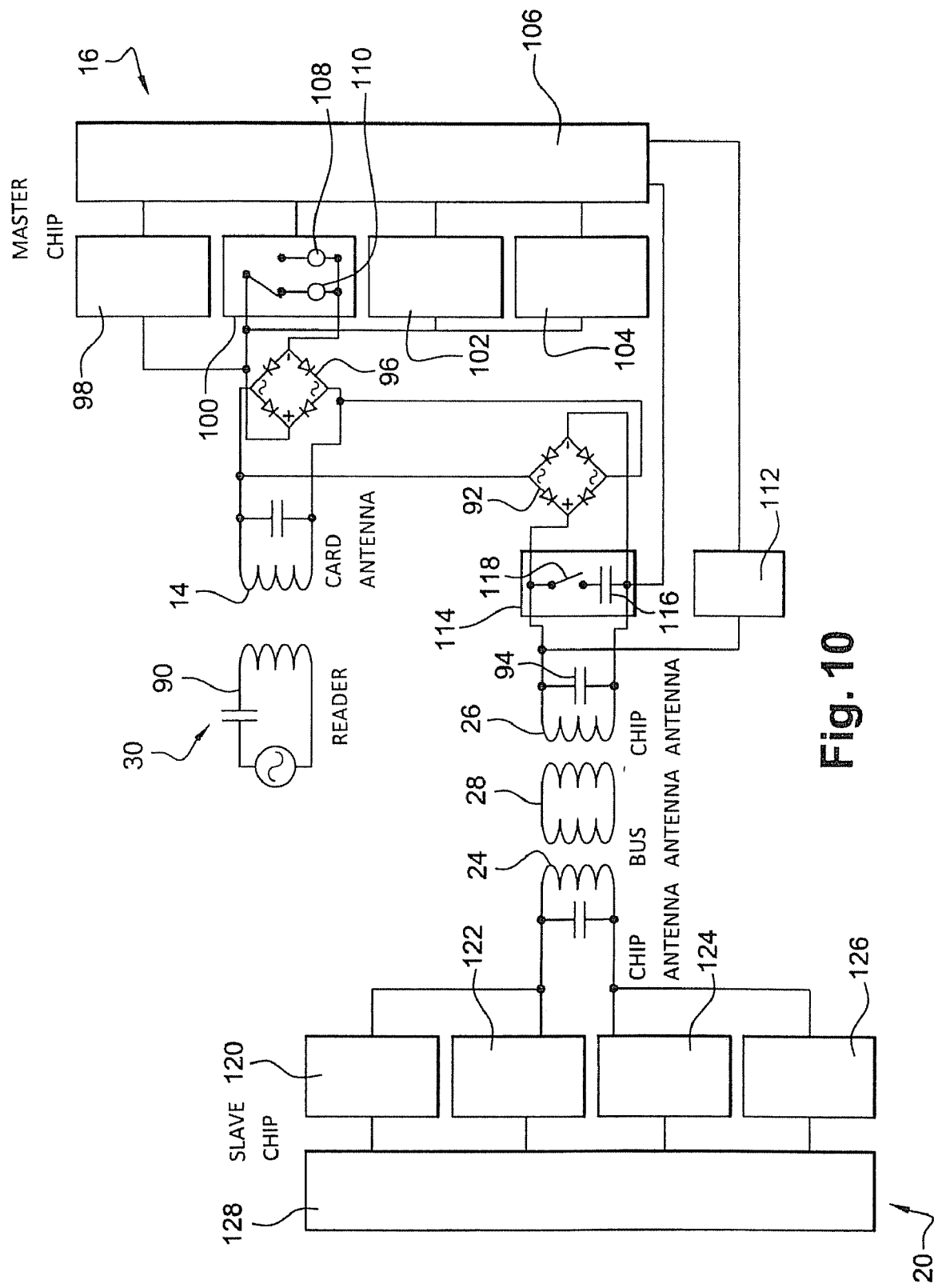
FIG. 10 is a more detailed schematic view of a master chip and a slave chip.

FIG. 10 schematically shows master chip 16, a slave chip, for example chip 20, a contactless reader 30, card antenna 14 and bus antenna 28.

Reader 30, comprising inductive antenna 90, communicates with master chip 16 and provides it with energy via a 13.56 MHz carrier in compliance with Standard ISO 14443.

Master chip 16 comprises a diode rectifier bridge 92, the input terminals of which are connected to the terminals of card antenna 14 and the output terminals of which are connected to the terminals of chip antenna 26. Bridge 92 therefore rectifies the signal on the terminals of chip antenna 14 in order to produce a double-frequency signal on the terminals of chip antenna 26.

Master chip 16 also comprises a resonant capacitor 94 which is connected to the terminals of chip antenna 26 and selects, in association with the coil of the chip antenna, a frequency band that is centered on twice the frequency of the carrier used for communication between master chip 16 and reader 30, namely a frequency of 27.12 MHz in compliance with Standard ISO 14443.

For example, if the signal "f(t)" produced on the terminals of card antenna 14 by the magnetic field emitted by antenna 90 of reader 30 is purely sinusoidal, i.e. has the following wave shape:

$$f(t)=A\sin(\omega t)$$

where A is an amplitude, t is time and ω is the pulsation of the carrier.

Signal "g(t)" rectified by bridge 92 is then a signal in accordance with the equation:

$$g(t) = \frac{2A}{\pi} + \frac{4A}{\pi}\left(\frac{1}{3}\cos(2\omega t) - \frac{2}{7}\cos(4\omega t) + \ldots\right)$$

Rectification of signal f(t) by bridge 92 therefore produces harmonics, the first of which, pulsation harmonic 2ω, is selected by resonant capacitor 94.

A carrier according to equation $$\frac{4A}{3\pi}\cos(2\omega t)$$

is thus obtained simply and effectively from the carrier used for communication between master chip 16 and contactless reader 30. The carrier produced by rectification and filtering thus offers a separate frequency channel for inter-chip communication. What is more, because this carrier has a higher frequency, a higher data rate is obtained.

Note that the amplitude of this carrier, namely $$\frac{4A}{3\pi} = 0,42A,$$

is sufficient to power the slave chips of the contactless card via bus antenna 28 if significant coupling is achieved between chip antennas 24, 26 and bus antenna 28.

Moreover, because the electromotive force induced by the carrier is proportional to the frequency of the carrier, the energy that can be transmitted by each chip antenna is doubled. In a simple and effective manner, this compensates, at least partially, for the small surface area of the chip antenna.

Master chip 16 also comprises a second rectifier bridge 96 which is connected to the input of card antenna 14 and the outputs of which are connected to demodulator 98, modulator 100, clock recovery circuit 102 and master-chip power supply regulator circuit 104, with the latter being under the control of a sequencer 106. These circuits are conventional and are not described in greater detail below.

The function of modulator 100 is to vary the electromotive force between card antenna 14 and antenna 90 of the reader by alternately imposing two voltage values between the terminals of bridge 94 which are connected to card antenna 14. Amplitude modulation of the signal on the terminals of card antenna 14 is thus obtained. The two voltage values produced by modulator 100 are generated respectively by two voltage sources 108, 110.

Preferably, each of these sources 108, 110 comprises a Zener diode whereof the Zener voltage is used or a diode whereof the knee voltage is used. Alternatively, each of the voltage sources consists of a MOS transistor which has its drain and grid interconnected and its drain voltage is imposed in order to regulate the voltage value delivered by the voltage source. One effect of using such a diode- or MOS transistor-based setup is that there is substantially no modulation on chip antenna 26 because of the presence of bridge 92 and the LC filtering implemented by combining resonant capacitor 94 and the coil of chip antenna 26. In addition, using a diode or MOS transistor allows effective dispersion of variations in the consumption of master chip 16.

Finally, for communication between master chip 16 and slave chip 20, the master chip comprises a second demodulator 112 as well as a second modulator 114, with both of these being under the control of sequencer 106.

Second modulator 114 preferably comprises a serial arrangement of a capacitor 116 and a switch 118 connected to the terminals of chip antenna 26 connected in parallel with the capacitor of capacitor 94. Opening and closing switch 118 thus modulates the load of chip antenna 26, therefore producing amplitude modulation of the signal received by the other slave chips because of misalignment of the LC circuit of the chip antenna. Purely capacitive modulation of the load of chip antenna 26 has the effect of minimizing interference with the signal between card antenna and antenna 90 of reader 30 caused by the signal on the terminal of chip antenna 26.

Slave chip 20 comprises a conventional front-end communication assembly for RFID labels, namely a demodulator 120, a modulator 122, a clock recovery circuit 124, a power supply regulator circuit 126 and a sequencer 128. Apart from the fact that the slave chip communicates and is powered by a carrier having a frequency which is twice that of the carrier used by reader 30, its operation is conventional and is therefore not explained in greater detail below.

The invention has the following advantages:
Inter-chip communication is independent of communication between the master chip and a contactless reader;
Inter-chip communication is direct with no need to use an off-card reader as a communication intermediary;
Inter-chip communication does not require any electrical contact or track and this simplifies packaging of the contactless chip; and
If required, no stacking of chips; this allows high degree of mechanical flexibility for the contactless card.

The invention claimed is:
1. A device comprising:
a first inductive antenna; and
a plurality of chips each comprising an integrated circuit and a second inductive antenna for supplying power and communicating with said integrated circuit,
wherein one chip amongst the plurality of chips is capable of being connected to the first inductive antenna and wherein the device also comprises a third inductive antenna which is inductively coupled to each of the second antennas of the plurality of chips.

2. The device as claimed in claim 1, wherein said one chip amongst the plurality of chips is electrically connected to said first inductive antenna.

3. The device as claimed in claim 2, wherein the surface defined by the third antenna substantially equals the total surface area defined by the second antennas of the plurality of chips.

4. The device as claimed in claim 1, wherein inductive coupling between the second antennas and the third antenna is capable of making it possible to produce a nominal supply voltage in each chip that is sufficient for operation of the integrated circuit in each chip.

5. The device as claimed in claim 1,
wherein each of the second antennas of the plurality of chips forms at least one inductive loop,
wherein the third antenna forms at least one inductive loop, and
wherein the surface defined by the second antenna is back to back with the surface defined by the third antenna.

6. The device as claimed in claim 5, wherein the third antenna is twisted so as to define elementary surface areas that are respectively back to back with the second antennas of the plurality of chips.

7. The device as claimed in claim 6, wherein the device is a smart card and wherein the third antenna is twisted in the plane of the card.

8. The device as claimed in claim 1, wherein the third antenna is bent and twisted so as to define elementary surface areas that are respectively wrapped around the second antennas of the plurality of chips.

9. The device as claimed in claim 8, wherein the device is a smart card and wherein the third antenna is bent in a plane which is substantially perpendicular to the plane of the card.

10. The device as claimed in claim 9, wherein the chip which is capable of being connected to the first antenna comprises a module for rectifying the signal received on the first antenna and a module for selecting a frequency range of the rectified signal with the rectified and filtered signal forming a carrier for the second communication channel.

11. The device as claimed in claim 1, wherein it is capable of communicating with its external environment via the first antenna over a first communication channel and in that chips are capable of communicating with each other via the third antenna over a second communication channel which is different from the first communication channel.

* * * * *